United States Patent
Oishi et al.

(10) Patent No.: US 9,124,921 B2
(45) Date of Patent: Sep. 1, 2015

(54) APPARATUS AND METHOD FOR PLAYING BACK CONTENTS

(75) Inventors: Kyoji Oishi, Kobe (JP); Hiroyuki Takahashi, Kobe (JP)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 61 days.

(21) Appl. No.: 13/391,261

(22) PCT Filed: Aug. 21, 2009

(86) PCT No.: PCT/JP2009/004005
§ 371 (c)(1),
(2), (4) Date: Jun. 15, 2012

(87) PCT Pub. No.: WO2011/021249
PCT Pub. Date: Feb. 24, 2011

(65) Prior Publication Data
US 2012/0251071 A1    Oct. 4, 2012

(51) Int. Cl.
H04N 9/80        (2006.01)
H04N 21/43       (2011.01)
H04N 21/458      (2011.01)
H04N 21/8543     (2011.01)
H04N 21/431      (2011.01)
H04N 21/433      (2011.01)

(52) U.S. Cl.
CPC ....... *H04N 21/4307* (2013.01); *H04N 21/4316* (2013.01); *H04N 21/4331* (2013.01); *H04N 21/458* (2013.01); *H04N 21/8543* (2013.01)

(58) Field of Classification Search
USPC ................................. 386/235–248
See application file for complete search history.

(56) References Cited

U.S. PATENT DOCUMENTS

| 2003/0152366 | A1* | 8/2003 | Kanazawa et al. | 386/69 |
| 2003/0202784 | A1* | 10/2003 | Yamauchi et al. | 386/125 |
| 2006/0274214 | A1* | 12/2006 | Carro | 348/722 |
| 2007/0204299 | A1* | 8/2007 | Vosseller | 725/46 |

FOREIGN PATENT DOCUMENTS

| JP | 2002-281454 | 9/2002 |
| JP | 2002-297494 | 10/2002 |
| JP | 2002-330433 | 11/2002 |
| JP | 2004-140488 | 5/2004 |

(Continued)

OTHER PUBLICATIONS

International Search Report for International Application No. PCT/JP2009/004005, mailed Oct. 6, 2009, 2 pages.
Notice of Reasons for Rejection dated Sep. 17, 2013 regarding Japan Patent Application No. JP 2011-527491.

(Continued)

*Primary Examiner* — Hung Dang
(74) *Attorney, Agent, or Firm* — Arent Fox LLP

(57) ABSTRACT

A content playing device that displays multiple contents including scheduled-distribution contents is disclosed. Multiple player units include a moving picture player unit that, when receiving a start-to-prepare command, performs playback preparation processing based on the type of contents, moves into a wait state, and downloads at least scheduled-distribution contents from an external device that is connected through communications. The controller, according to the start of playback timing for contents, outputs a start-to-prepare command to the player units, and at the start of playback timing, outputs a start of playback command to the player units.

11 Claims, 12 Drawing Sheets

(56) References Cited

FOREIGN PATENT DOCUMENTS

| | | |
|---|---|---|
| JP | 2004-194252 | 7/2004 |
| JP | 2005-223685 | 8/2005 |
| JP | 2006287642 A | 10/2006 |
| JP | 2009-065572 | 3/2009 |

OTHER PUBLICATIONS

Notice of Reasons for Rejection dated Jul. 11, 2014 regarding Japan Patent Application No. JP 2011-527491.

International Preliminary Report on Patentability dated Mar. 13, 2012 and Written Opinion dated Oct. 6, 2009 regarding PCT/JP2009/004005.

* cited by examiner

```
<smil xmlns="http://www.w3.org/2001/SMIL20/Language"/>
 <head>
  <root-layout id="fullscreen" width="1920" height="1080"/>     ⎫
  <region id="region1" left="0" top="0" width="1600" height="900"/>   ⎬ P1
  <region id="region2" left="1600" top="0" width="320" height="900"/> ⎪
  <region id="region3" left="0" top="900" width="1920" height="180"/> ⎭
 </head>
 <body>
  <seq>
   <par id="par0" syncBehaviorDefault="locked" >                      ⎫
     <video src="Stck.mpg" region="region1" dur="15s"/>                ⎬ P2
     <img src="Stck.bmp" region="region2" dur="15s"/>                  ⎪
     <textstream src="Stck.txt" region="region3" dur="15s"/>           ⎭
   </par>
   <par id="par1" syncBehaviorDefault="locked" >                      ⎫
     <video src="Curr.mpg" region="region1" dur="30s"/>                ⎬ P3
     <img src="Curr.bmp" region="region2" dur="30s"/>                  ⎪
     <textstream src="Curr.txt" region="region3" dur="30s"/>           ⎭
   </par>
   <par id="par2" syncBehaviorDefault="canSlip" syncTolerance="3s"/>  ⎫
     <video src="Wtr.mpg" region="region1" dur="15s"/>                 ⎬ P4
     <img src="Wtr.bmp" region="region2" dur="15s"/>                   ⎪
     <textstream src="Wtr.txt" region="region3" dur="15s"/>            ⎭
   </par>
  </seq>
 </body>
</smil>
```

Legend
 Stck = stock
 Curr = currency
 Wtr = weather

*FIG. 4*

| Sync ID | Playback start time TS | Actual playback time Ta | Moving picture display region A1 | Still picture display region A2 | Telop display region A3 |
|---|---|---|---|---|---|
| 1 | 07:00:00 | 07:00:00 | stock.mpg fixed | stock.bmp fixed | stock.txt fixed |
| 2 | Ta1 + 00:15 | 07: 00:15 | currency.mpg fixed | currency.bmp fixed | currency.txt fixed |
| 3 | Ta2 + 00:00 | 07:00:51 | weather.mpg 3 sec or less | weather.bmp 3 sec or less | weather.txt 3 sec or less |

*FIG. 6*

```
c=IN IP4 0.0.0.0
a=control:rtsp://192.168.0.1/video
a=type:vod seekable
a=range:npt=0-15.015
m=video 0 RTP/AVP 33
a=control:rtsp://192.168.0.1/video
a=framerate:29.97
```

FIG. 9

```
c=IN IP4 239.192.0.0
a=control:rtsp://192.168.0.1/live
a=type:scheduled
m=video 49152 RTP/AVP 33
a=control:rtsp://192.168.0.1/live
a=framerate:29.97
```

FIG. 10

APPARATUS AND METHOD FOR PLAYING BACK CONTENTS

CROSS-REFERENCE TO RELATED APPLICATION

This application is a United States National Stage Application under 37 CFR §371 of International Patent Application No. PCT/JP2009/004005, filed Aug. 21, 2009, which is incorporated by reference into this application as is fully set forth herein.

FIELD OF TECHNOLOGY

This invention is directed to a content playing device and a content playback method; in particular, it relates to a content playing device and a content playback method that displays multiple contents by synchronizing them.

BACKGROUND TECHNOLOGY

In recent years, content playback systems that distribute contents, such as moving pictures, telops, and still images, that display these contents on multi-screens, and that provide information to users on an multi-facet basis have come into wide-spread use.

In these content playback systems, multiple contents that are displayed on a multi-screen basis are displayed in synchronization. For example, Patent Reference 1 describes an apparatus comprising data request receive means and a control data generation unit. The data request receive means send requests on media data on first and second foreground images to a server and receive messages from the server. The control data generation unit controls said data request receive means so that, based on the information that indicates the wait time before the start of display of each foreground image contained in SIML (Synchronized Multimedia Integration Language) data, said data request receive means issue a message requesting media data to the corresponding server at a time earlier than the starting time for the display of each foreground image by said wait time. By this constitution, this apparatus makes it possible to display the first and second foreground images by combining them with a background image at a time specified in the scene description in the SMIL data.

Further, Patent Reference 2 describes an apparatus capable of playing back content data, such as multimedia scenes while satisfying the time specification by scene description information, reducing the time delay until the start of playback or until the start of the next playback, and also reducing the buffer area. This apparatus, while entering, by means of a transceiver, scene description information that specifies temporal sequence related to the playback of contents, measures the vacant band width on the network. In addition, it provides scene description information to a transfer scheduling unit and if a vacant band width exists, it requests from the content distribution apparatus the moved up transfer of contents data, time-wise lagging the previously received content data, based upon scene description information.

PRIOR ART REFERNCES

Patent References

Patent Reference 1: Patent Disclosure 2001-285832
Patent Reference 2: Patent Disclosure 2002-268999

SUMMARY OF THE INVENTION

Problems to be Solved by the Invention

Such an apparatus as described above, however, is based on the assumption that the content is an on-demand content which can be downloaded at any time from its arbitrary temporal position. For this reason, if multiple contents to be displayed in synchronization contain a distribution content, such as a live broadcasting content, for which the schedule for distribution is fixed in advance by the distributor, the content cannot be displayed at the determined time in accordance with the time which is set by the distributor, which is a problem. In the case of the apparatus described above, for example, if the distribution of a distribution content for which the schedule of distribution is specified in advance by the distributor is requested for a distribution time earlier than the starting time of display, a content for a time earlier than the content to be displayed at the starting time of display is distributed. If this is displayed at the display starting time, an unintended content can end up being displayed.

Therefore, an objective of the present invention is to provide a novel and useful content playing device and content playback method. Specifically, an objective of the present invention, with respect to a distribution content for which the schedule of distribution is determined by the distributor, is to display the content of the time determined by the distribution schedule when multiple contents containing a distribution content for which the schedule of distribution is fixed by the distributor are to be displayed in synchronization.

Means of Solving the Problems

According to a point of view of the present invention, the apparatus provided by the invention is an apparatus that displays multiple contents by reproducing them, on a monitor in parallel, wherein the apparatus comprises multiple players that play back each of the aforementioned multiple contents; control means that acquire playback information on said multiple contents and that provide a command to start the reproduction process to all of the above multiple players if the playback starting timing contained in the above playback information is reached in a situation where all of the above multiple players are in a wait state for playback; and means (14) of producing the output of the respective video signals of said played back multiple contents; wherein said multiple contents include a scheduled distribution-type content for which a schedule of distribution is fixed; and wherein the downloading of the content in response to said playback starting command is initiated, and the content downloaded in this manner is played back.

According to the present invention, the playback means, if the content type is a schedule distribution type content, start the downloading of the content after receiving a start-of-playback command from the control means and play back the downloaded data. Therefore, when multiple contents containing a scheduled distribution-type content are to be displayed in synchronization, with regard to the scheduled distribution-type content, they can display the content of the time fixed by the distribution schedule according to the schedule of distribution. It should be noted that in the present SPECIFICATION and CLAIMS, the term scheduled distribution content and the term schedule distribution-type content refer to the same type of content, and it means a content that is distributed according to a predetermined distribution schedule.

According to another point of view of the present invention, the invention provides a playback method which is a playback method in which multiple contents are displayed on a monitor in parallel. In the playback method, the controller represents the step of acquiring playback information on said multiple contents, wherein the playback information includes the step of representing said multiple contents; the above step (S101) including the timing at which the playback of said multiple contents is started; the steps of waiting for playback (S202-S205, S209) wherein each of multiple players (102-104) makes preparations for downloading each of said multiple contents;

According to the present invention, if the type of the content to be played back is the scheduled distribution-type content, the player unit starts the downloading of the content after receiving a playback start command from the controller and plays back the downloaded data; therefore, while displaying scheduled distribution-type contents according to schedule, it can display multiple contents, including scheduled distribution-type contents, by synchronization.

Effects of the Invention

The present invention can provide a novel and useful content playing device and content playback method; further, when multiple contents including a distribution content for which the schedule of distribution is determined on the distribution side are to be displayed in synchronization, with regard to the distribution content for which the schedule of its distribution is determined by the distribution side, the invention can provide a content playing device and content playback method that can display the content of the time determined by the distribution schedule.

BRIEF DESCRIPTION OF THE DRAWINGS

[FIG. 4] a drawing showing an example SMIL file downloaded by the content playing device in a mode of embodiment of the present invention.

[FIG. 6] a drawing showing an example of information indicating the synchronization of contents.

[FIG. 9] a drawing showing an example of DESCRIBE response with respect to an on-demand content.

[FIG. 10] a drawing showing an example of DESCRIBE response with respect to a scheduled distribution content.

MODES OF EMBODIMENT OF THE INVETION

The text below describes modes of embodiment of the present invention, with references to drawings.

Figure 1:
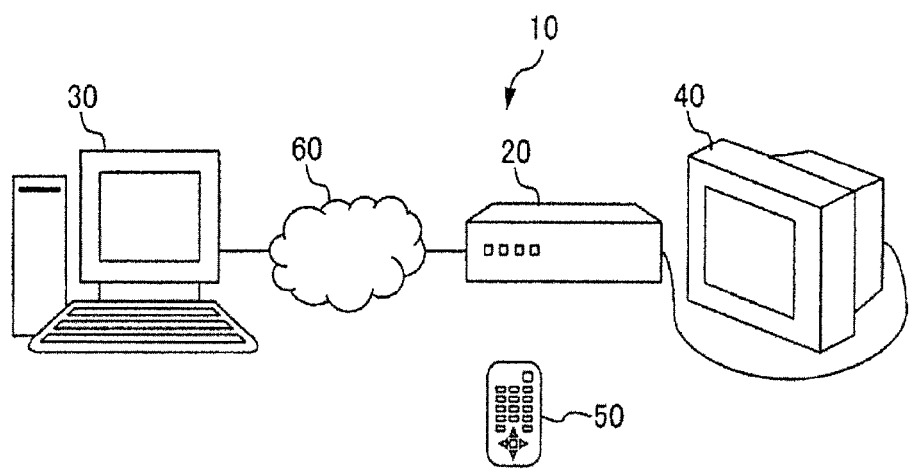
[FIG. 1] a schematic configuration chart that shows the configuration of the content distribution/playing device in a mode of embodiment of the present invention.

FIG. 1 is a schematic configuration chart that shows the configuration of the content distribution/playback system in a mode of embodiment of the present invention. Referring to FIG. 1, the content distribution/playing device 10 comprises a content playing device 20, a server 30, a monitor 40, a remote controller 50, and an IP (Internet Protocol) net 60. The content playing device 20, receiving a command for downloading a content based on a signal from the remote controller 50, downloads multiple contents including a scheduled distribution content from the server 30. The content playing device 20 synchronizes and plays back the downloaded contents, and displays them on the monitor 40 on a multi-screen basis. Here, in terms of content types, there are on-demand contents and scheduled-distribution contents. The on-demand content is downloaded from an arbitrary temporal position of the content at any time, in response to a command from the content playing device 20. The scheduled-distribution content, when a request for its distribution is made, is downloaded from the temporal position according to a requested time and a predetermined distribution schedule of said content.

The server 30, connected to the IP net 60, distributes contents to the content playing device in response to requests from the content playing device 20. The server 30, in response to requests from the content playing device 20, distributes SMIL files to the content playing device 20. SMIL files include information that indicates contents to be displayed on a multi-screen basis, information that indicates the timing of the start of playback of a content, and information that indicates the synchronization relationship between contents; further details thereof will be provided later. The server 30 can be one unit or multiple units. The system can be configured so that the server 30 distributes all contents and SMIL files, or alternatively, several contents, with the exception of the scheduled-distribution content, such as still images or some of the SMIL files, are stored in the memory (the memory 12 in FIG. 2) in the content playing device 20 or on a hard disk unit. In addition, multiple servers 30 can be provided, such as a server that stores SMIL files and a server that stores contents. Further, one or more independent servers 30 can be provided, and one or more servers can be provided for other contents as well.

The monitor 40 is an image display apparatus, such as a liquid crystal display or a CRT (Cathode Ray Tube) that displays video based on the video signals that are output by the content playing device 20. The remote controller 50, equipped with a four-way directional key, an apply key, and so forth, operates the content playing device 20 by transmitting signals in response to the operation of such keys by the user.

The IP net 60 being a network, in this mode of embodiment it is described as a network using the Internet Protocol. It should be noted that the IP net 60 can be a network using other protocols, provided that it is a communication path that connects the content playing device 20 and the server 30 in an inter-communicating manner.

Figure 2:
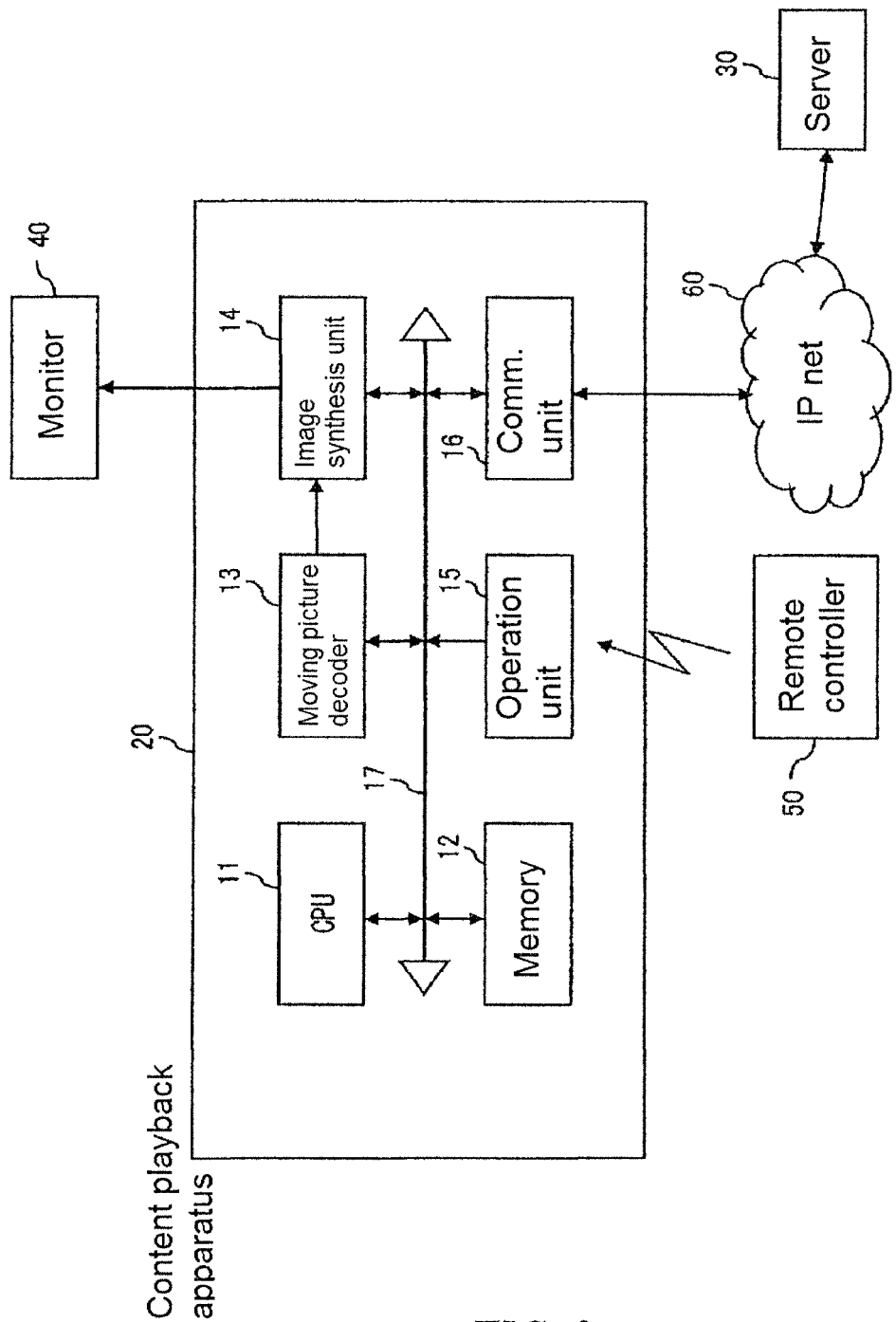
[FIG. 2] a schematic block diagram of the content distribution/playing device, including the configuration of the content playing device in a mode of embodiment of the present invention.

FIG. 2 is a schematic block diagram of the content distribution/playing device, including the configuration of the content playing device in a mode of embodiment of the present invention. Referring to FIG. 2, the content playing device 20 comprises a CPU (Central Processing Unit) 11, a memory unit 12, a moving picture decoder 13, an image synthesizer unit 14, an operation unit 15, a communication unit 17, and a bus 17 that interconnects these components.

The CPU11, by reading a program from the memory 12 and executing it, controls the entire content playing device 20 through the bus 17. The CPU11 also performs controls such as playing back contents other than moving pictures, including still images and telops, generating image data, and directing their output to the image synthesis unit 14.

The memory 12 is flash memory and other non-volatile semiconductor memory units or volatile semiconductor memory units, such as RAM (Random Access Memory). The memory 12 can also be an optical disk unit, such as a hard disk unit or CD-ROM, or a magneto-optical disk. The memory can be constituted by employing the aforementioned various memory types singly or it can be constituted by combining them. The memory 12 stores the program that is executed by the CPU11, the contents downloaded from the server 30, and SMIL files. The memory 12 also functions as working memory when the CPU11 executes a program.

The moving picture decoder 13 decodes moving picture contents in encoding formats including MPEG (Moving Picture Experts Group) 2 and H 264/AVC (Advanced Video Coding). The moving picture decoder 13 decodes the moving picture contents distributed by the server 30 according to its encoding method, and outputs the image data produced by the decoding process to the image synthesis unit 14. The moving picture decoder 13 can directly output the image data to the image synthesis unit 14 or it can output it to the image synthesis unit 14 through the bus 17. The moving picture decoder 13 is either a dedicated decoding chip or a circuit. As an alternative aspect of embodiment, the moving picture decoder 13 can perform decoding wherein decoding software operates on a CPU not shown in drawings, where the CPU can be the CPU11.

The image synthesis unit 14 performs the processing of synthesizing the image data composing the decoded moving picture contents with the image data consisting of still images and telop images generated by the CPU11, and generates video signals for multi-screen display. The image synthesis unit 14 outputs multi-screen display video images for display on the monitor 40. Whereas in this mode of embodiment an example is described where a multi-screen display is provided on a single monitor, image data constituting a moving picture content, still images, and telop image data can be displayed separately. In this case, the image synthesis unit 14, instead of synthesizing these images, outputs the individual video signals, alternatively synthesizing some images only, to the respective monitors.

The operation unit 15 contains a receiver that receives signals, such as wireless or infrared signals, transmitted by the remote controller 50. The operation unit 15 receives signals transmitted by the remote controller 50 and outputs information corresponding to the key operation commands contained in said signals. Alternatively, the operation unit 15 can be equipped with keys and output information corresponding to the operation of the keys by the user.

The communication unit 16, connected to the IP net 60, performs Internet protocol-based communications with the server 30 connected via the IP net 60, according to the commands from the CPU11.

Figure 3:
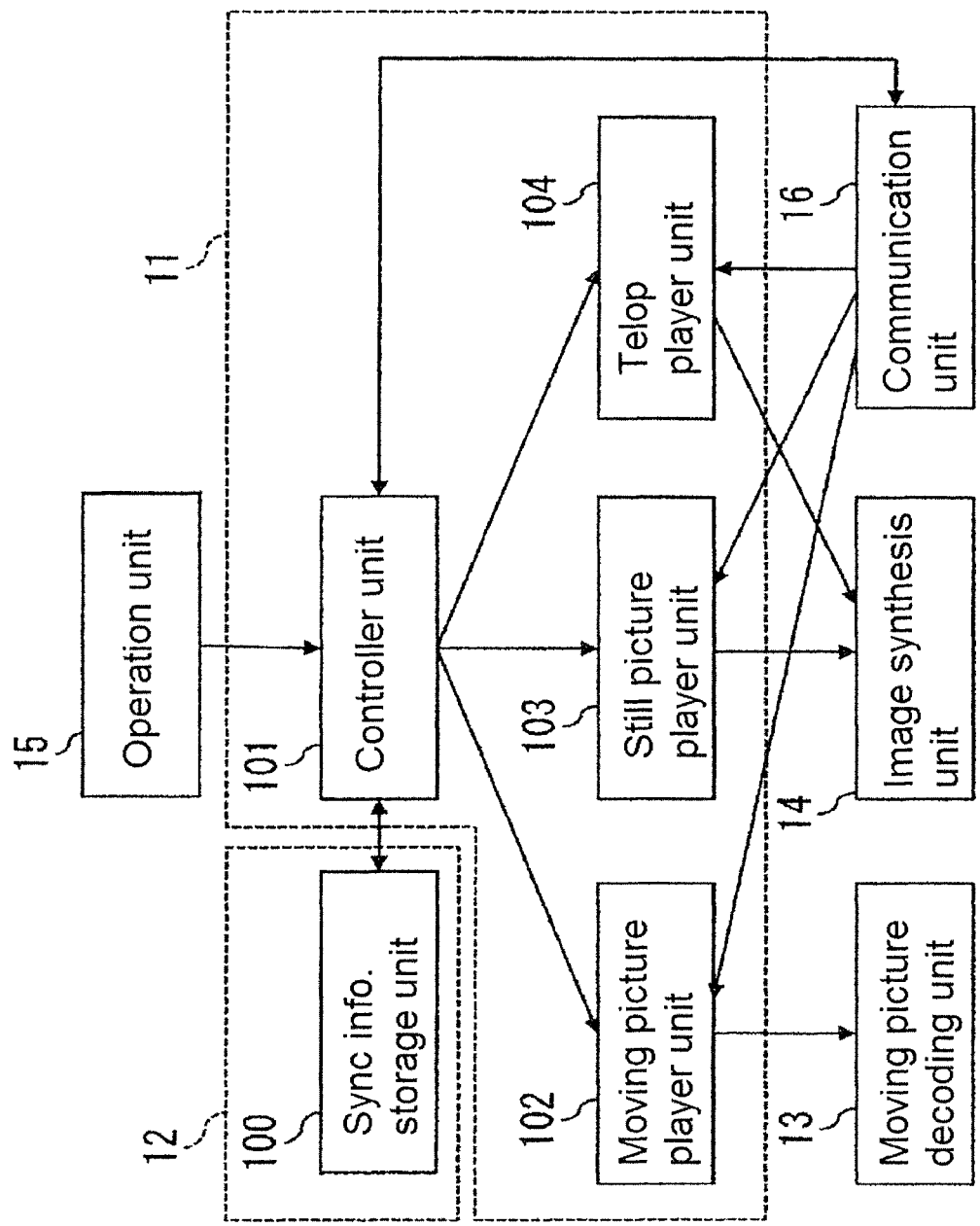
[FIG. 3] a functional configuration diagram of the content playing device in a mode of embodiment of the present invention.

FIG. 3 is functional configuration diagrams of the content playing device of a mode of embodiment of the present invention. Referring to FIG. 3, in the content playing device 20 the functions of the controller 101, the moving picture player unit 102, the still image player unit 103, and the telop player unit 104 are implemented when the CPU11 works together with the program stored in the memory 12. The memory 12 operates as a synchronization information storage unit 100. Whereas FIG. 3 shows on each of the moving picture player units 102, still image player unit 103, and telop player unit 104, they are generated by the controller 101 in numbers equal to the number of contents to be played back.

The controller 101, when receiving a command to view and listen to content from the user through the operation unit 15, downloads the SMIL file on the content from the server 30 which is connected through the IP net 60. The controller 101 generates information on the synchronization of the content (synchronization information) based on the SMIL file and stores it in the synchronization information storage unit 100. Further, the controller 101 references the information indicating synchronization in the synchronization information storage unit 100, and activates players in numbers equal to the number of contents to be played back. If the time for starting a playback is missed by a predetermined length of time, the controller 101 outputs a prepare-to-start command to the player that plays back the content at said start-of-playback timing. If, as a result, all of the player units 102, 103, and 104 that play back the contents in the synchronization relation indicated in the SMIL file do not go into a wait state by the start-of-playback timing, the controller 101 waits, and when detecting that all of the player units 102, 103, and 104 have gone into the wait state, it outputs a start-of-playback command to all of these player units 102, 103, and 104.

The moving picture player unit 102 being a player that corresponds to one moving picture content, when receiving a start-of-playback command the moving picture player unit downloads moving picture content from the server 30 through the communication unit 16, and plays it back by directing the output of the downloaded moving picture content to the moving picture decoder 13. Upon receipt of a prepare-to-start command, the moving picture player unit 102 performs playback preparation processing based on the type of the content, and moves to the wait state. Details on the playback preparation processing will be provided later.

The still picture player unit 103 being a player that corresponds to one still picture content, when receiving a start-of-playback command the still picture player unit downloads a still picture content from the server 30 through the communication unit 16, and plays it back. Upon receipt of a prepare-to-start command, the still picture player unit 103 performs playback preparation processing, including the downloading of the still picture content, and moves to the wait state. The still picture player unit 103 outputs the image data of the reproduced and generated still picture content to the image synthesis unit 14.

The telop player unit 104 being a player that corresponds to one telop display content, when receiving a start-of-playback command the telop player unit downloads a telop display content from the server 30 through the communication unit 16, and plays it back. Upon receipt of a prepare-to-start command, the telop player unit 104 performs playback preparation processing, including the downloading of the telop display content, and moves to the wait state. The telop player unit 104 outputs the image data of the reproduced and generated telop content to the image synthesis unit 14.

FIG. 4 is a drawing showing an example SMIL file downloaded by the content playing device in a mode of embodiment of the present invention. Referring to FIG. 4, the SMIL file comprises a part P1 that defines the display area for multi-screen display, information that indicates multiple contents, information that indicates a start-of-playback timing (start-of-playback time) for the contents, and information that indicates the synchronization relationship between the contents, which are referred to as parts P2-P4. The SMIL file relates to a news program that provides three types of news (stock news, currency exchange news, and weather forecasts). The SMIL file does not contain information that identifies the type of a given content, and type information is coded in DESCRIBE response to be described later. The three moving picture files "stock.mpg", "currency.mpg", and "weather.mpg" are scheduled-distribution contents. The text below explains other still picture and telop contents by assuming that they are on-demand contents.

In part P1 in the SMIL file shown in FIG. 4, line 1 defines that the full screen consists of 1920 pixels in width and 1080 pixels in height. In line 2 of part P1, in the display region, "region 1", the left edge is the left edge of the full screen, and the top edge is the top edge of the full screen, and they are defined as 1600 pixels in width and 900 pixels in height. In line 3 of part P1, in the display region, "region 2", the left edge is the 1600-th pixel from the left edge of the full screen, and the top edge is the top edge of the full screen, and they are defined as 320 pixels in width and 900 pixels in height. In line 4 of part P1, in the display region, "region 3", the left edge is the left edge of the full screen, and the top edge is the 900-th pixel from the top edge of the full screen, and they are defined as 1920 pixels in width and 180 pixels in height.

In part P2 of the SMIL file shown in FIG. 4, it is defined that the moving picture content (video), the still picture content (img), and the telop (textstream) are to be displayed in synchronization (syncBehaviorDefault="locked"). In line 2 of part P2, the moving picture content is the file "stock.mpg" that provides stock news. In the display region "region 1", it is defined that the moving picture content is to be displayed (display time) for 15 seconds from the moving picture content start-of-playback timing "00:00". In line 3 of part P2, the still picture content is the file "stock.bmp", which is image data related to stock news, for example. In the display region "region 2", it is defined that the content is to be displayed for 15 seconds from the content start-of-playback timing "00:00". In line 3 of part P2, the telop is the file "stock.txt", which is a telop related to stock news, for example. In the display region "region 3", it is defined that the content is to be displayed for 15 seconds from the content start-of-playback timing "00:00".

In part P3 of the SMIL file shown in FIG. 4, it is defined as a start-of-playback timing when the contents defined in part P2 are to be displayed for 15 seconds that the moving picture content, the still picture content, and the telop are to be displayed in synchronization. In line 2 of part P3, the moving picture content is the file "currency.mpg" that provides currency exchange rate news. In the display region "region 1", it is defined that the moving picture content is to be displayed for 30 seconds. In line 3 of part P3, the still picture content is the file "currency.bmp", which is image data related to currency exchange rate news, for example. In the display region "region 2", it is defined that the content is to be displayed for 30 seconds. In line 4 of part P3, the telop is the file "currency.txt", which is a telop related to currency exchange rate news, for example. In the display region "region 3", it is defined that the content is to be displayed for 30 seconds.

In part P4 of the SMIL file shown in FIG. 4, it is defined, as a start-of-playback timing when the contents defined in part P3 are to be displayed past the content display time, the moving picture content, the still picture content, and the telop are to be displayed in synchronization with 3 seconds of slippage from the start-of-playback timing (syncBehaviorDefault="canSlip" syncTolerance=3s"). In line 2 of part P4, the moving picture content is the file "weather.mpg" that provides weather forecast news. In the display region "region 1", it is defined that the moving picture content is to be displayed for 15 seconds. In line 3 of part P4, the still picture content is the file "weather.bmp", which is image data related to weather forecasts, for example. In the display region "region 3", it is defined that the content is to be displayed for 15 seconds. In line 4 of part P4, the telop is the file "weather.txt", which is a telop related to weather forecasts, for example. In the display region "region 3", it is defined that the content is to be displayed for 15 seconds.

Figure 5:
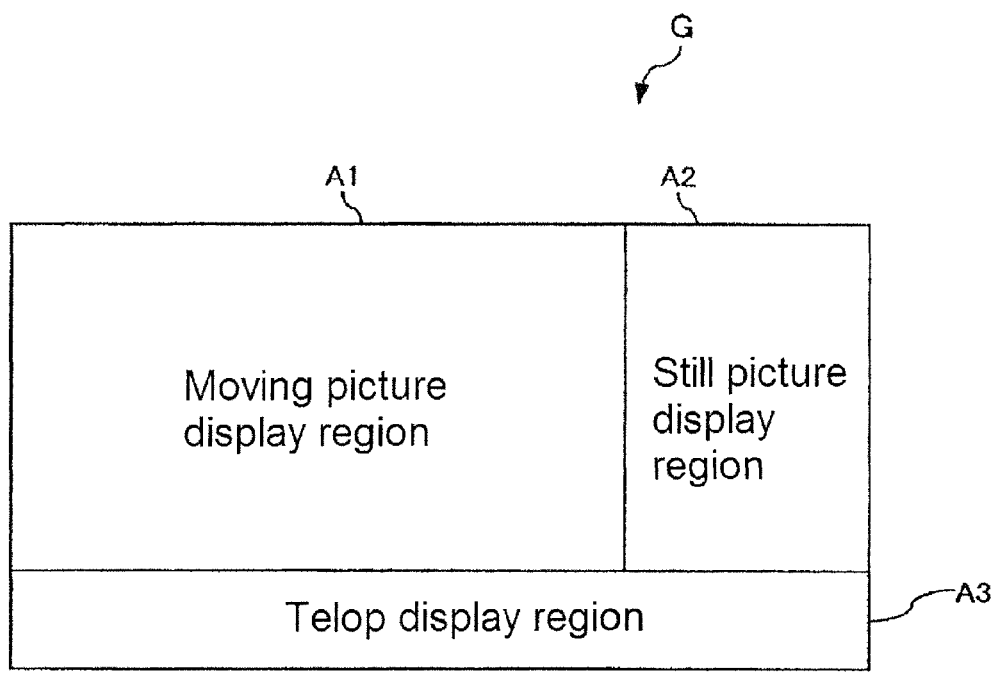
[FIG. 5] a drawing showing a configuration example of a multi-screen display that is output by the content playing device in a mode of embodiment of the present invention.

FIG. 5 is a drawing showing a configuration example of a multi-screen display that is output by the content playing device in a mode of embodiment of the present invention. Referring to FIG. 5, the multi-screen display G that the content playing device 20 displays on the monitor 40 comprises a moving picture display region A1, a still picture display region A2, and a telop display region A3. The video signal for the multi-screen display G is generated by the image synthesis unit 14 described in FIG. 3 above. In the moving picture display region A1 of the multi-screen display G, images based on image data generated by the moving picture decoder 13 are disposed. In the still picture display region A2, images based on image data generated by the still picture player 103 are disposed. In the telop display region A3, images based on image data generated by the telop player 104 are disposed. It should be noted that these display regions A1-A3 are established by the image synthesis unit 14 according to the definition provided in the SMIL file shown in FIG. 4, and they correspond to the player units 102, 103, and 104.

FIG. 6 is a drawing showing an example of information indicating the synchronization of contents. The information indicating the synchronization of contents shown in FIG. 6 (synchronization information) is stored in the synchronization information storage unit 100 shown in FIG. 3; it is generated by the controller 101 based on the SMIL file shown in FIG. 4. The sync ID shown in FIG. 6 represents the ID numbers that are assigned to the start-of-playback timings at which multiple contents are played back in synchronization. The content start-of-playback time Ts shown in FIG. 6 represents a start-of-playback timing. The actual playback time Ta shown in FIG. 6 represents the actual time at which the contents to be synchronized are played back. The moving picture display region A1, the still picture display region A2, and the telop display region A3 shown in FIG. 6 indicate the type of synchronization with respect to how the content file name and the content itself displayed in each region are to be synchronized. It should be noted that the synchronization information shown in FIG. 6 represents the case where the start-of-playback time for a program is "07:00:00", for example.

Referring to FIG. 6, in correspondence with the sync ID "1", the start-of-playback time "07:00:00", the moving picture display region A1 "stock.mpg" "fixed", the still picture display region A2 "stock.bmp" "fixed", and the telop display region A3 "stock.txt" "fixed" are stored in the memory. These pieces of information indicate that at the start-of-playback time for a program, in order to display the file "stock.mpg" in the moving picture display region A1, the file "stock.bmp" in the still picture display region A2, and the file "stock.txt" in the telop display region A3, the files are to be synchronized so that they will not slip past each other and the playback is to be started. Here, to synchronize in a manner that prevents slippage with one another means that if one of the contents is not ready to be played back after the passage of a start-of-playback time, the system waits until the content becomes ready for playback, and then plays back the files by synchronizing them. Further, referring to FIG. 6, in correspondence with the sync ID "1", "07:00:00" is stored in the memory as actual playback time Ta1. This means that the playback of all contents with the synch ID "1" and subject to synchronization is started at the start-of-playback time for the program. It should be noted that the information associated with the sync ID "1" is generated based on part 2 of the SMIL file shown in FIG. 4.

In correspondence with the sync ID "2", the start-of-playback time "Ta1+07:00:15", the moving picture display region A1 "currency.mpg" "fixed", the still picture display region A2 "currency.bmp" "fixed", and the telop display region A3 "currency.txt" "fixed" are stored in the memory. These pieces of information indicate that, in order to display the file "currency.mpg" in the moving picture display region A1, the file "currency.bmp" in the still picture display region A2, and the file "currency.txt " in the telop display region A3, 15 seconds after the start of the playback ["07:00:00" which is the actual playback time for the synch ID "1"] of all contents associated with sync "1" (beginning of the program) which is the start-of-playback time, the files are to be synchronized so that they will not slip past one another and the playback is to be started. Further, referring to FIG. 6, in correspondence with the sync ID "2", "07:00:15" is stored in the memory as actual playback time Ta2. This means that the playback of all contents with the synch ID "2" and subject to synchronization is started at the start-of-playback time (07:00:15). It should be noted that the information associated with the sync ID "2" is generated based on part 3 of the SMIL file shown in FIG. 4.

In correspondence with the sync ID "3", the start-of-playback time "Ta2+07:00:30", the moving picture display region A1 "weather.mpg" "in 3 seconds or less", the still picture display region A2 "weather.bmp" "in 3 seconds or less", and the telop display region A3 "weather.txt" "in 3 seconds or less" are stored in the memory. These pieces of information indicate that, in order to display the file "weather.mpg" in the moving picture display region A1, the file "weather.bmp" in the still picture display region A2, and the file "weather.txt " in the telop display region A3, 30 seconds after the start of the playback of all contents associated with sync "2", the files are to be synchronized so that they will not slip past one another and the playback is to be started. Further, referring to FIG. 6, in correspondence with the sync ID "3", "07:00:51" is stored in the memory as actual playback time Ta3. This means that the playback of all contents with the synch ID "3" and subject to synchronization can be started 51 seconds after the start of the program. It should be noted that the information associated with the sync ID "3" is generated based on part P4 of the SMIL file shown in FIG. 4. In particular, the condition "in 3 seconds for less" for each display region is based on line 1, [syncTolerance="3s"] in line 1 of part P4.

Figure 7:
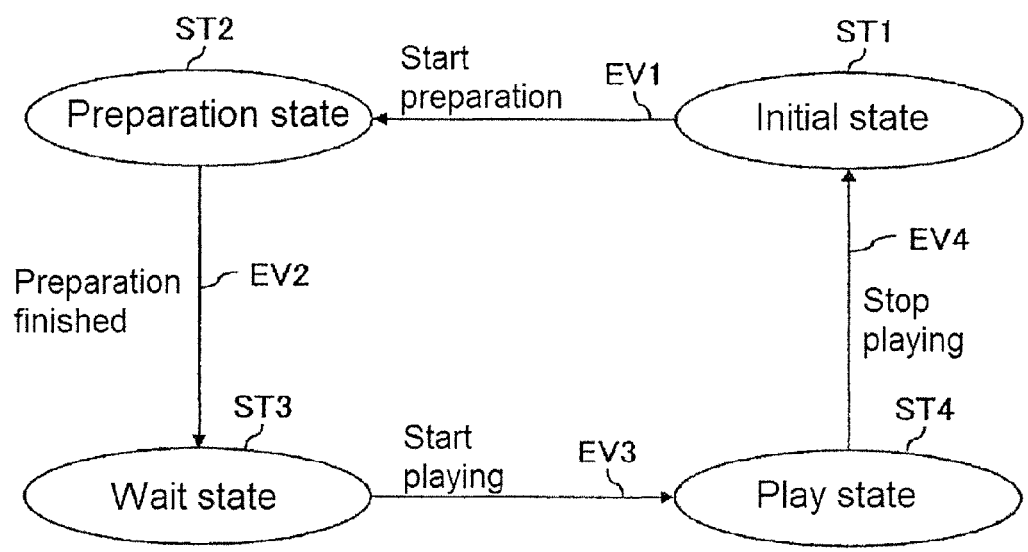
[FIG. 7] a state transition diagram of the moving picture player unit, the still picture player unit, and the telop player unit shown in FIG. 3.

FIG. 7 is a state transition diagram of the moving picture player unit, the still picture player unit, and the telop player unit shown in FIG. 3. Referring to FIG. 7, the moving picture player unit 102, the still picture player unit 103, and the telop player unit 104 each has one of four states: initial state ST1, preparation state ST2, wait state ST3, and playback state ST4. Each player unit, when generated by the controller 101, assumes the initial state ST1. When a player unit is ST1, if the player unit receives a start-of-preparation command EV1 from the controller 101, the player unit transitions to the preparation state ST2. In the case of the preparation state ST2, if the preparation for playback in the player unit is completed (preparation complete EV2), the player unit transitions to the wait state ST3. In the case of the wait state ST3, if the player unit receives a start-of-playback EV3 command from the controller 101, the player unit transitions to the playback state ST4. In the case of the playback state ST4, if the player unit receives a stop-playback EV4 command from the controller 101, the player unit transitions to the initial state ST1.

Figure 8:
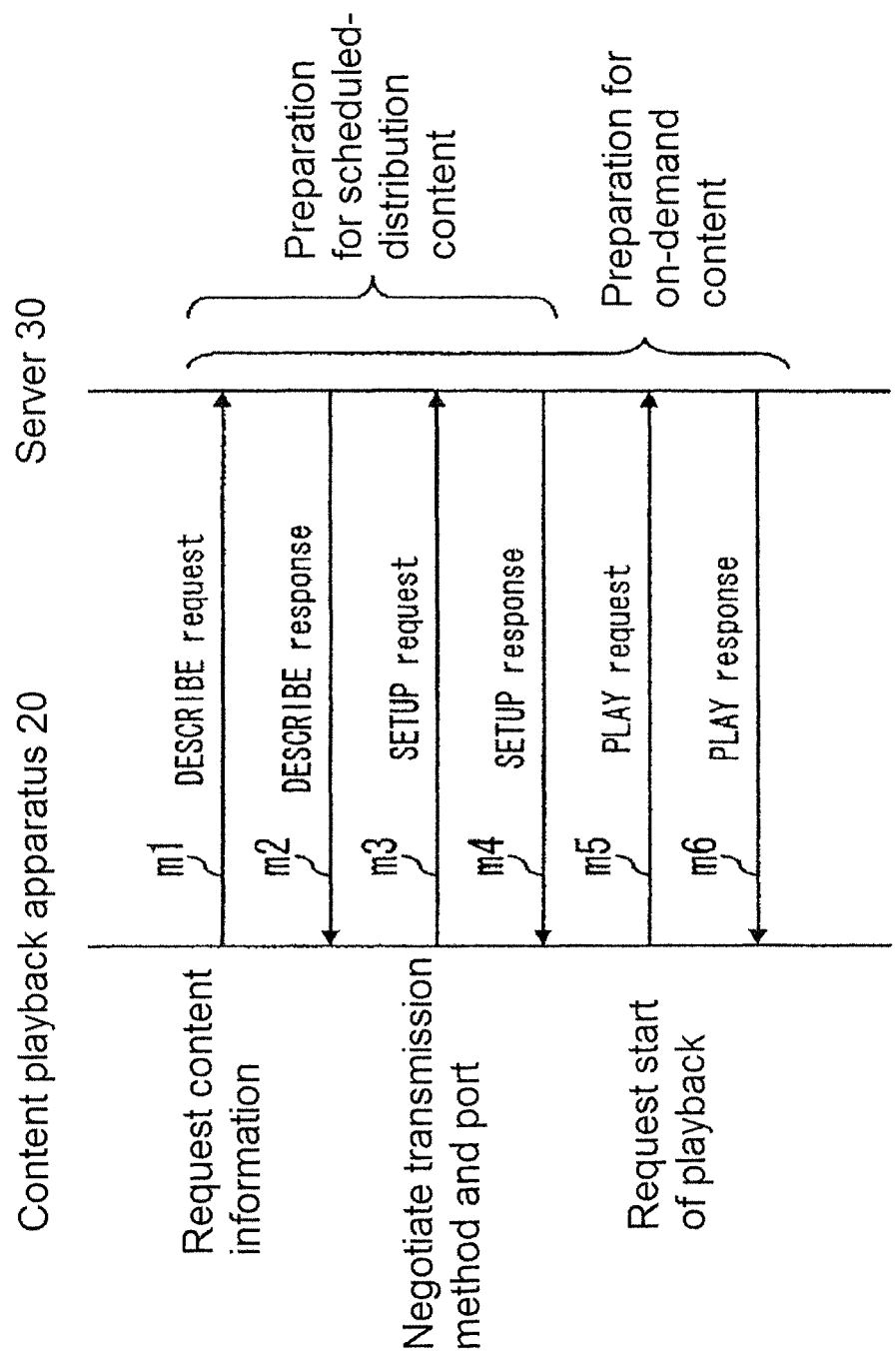
[FIG. 8] a sequence diagram showing the communication between the content playing device and the server in a mode of embodiment of the present invention.

FIG. 8 is a sequence diagram showing the communication between the content playing device and the server in a mode of embodiment of the present invention. Referring to FIG. 8, a player unit in the content playing device 20, the moving picture player unit 102 for example, requests information on the content to be played back from the server 30 through the communication unit 16 and the IP net 60 (m1). The request is issued in terms of a DESCRIBE request in RTSP (Real Time Streaming Protocol). When receiving this request, the server 30 transmits to the content playing device 20 a DESCRIBE response including a response coded in SDP (Session Description Protocol) with respect to the DESCRIBE request (m2). The moving picture player unit 102 determines whether the content is an on-demand content or a scheduled-distribution content, based upon the DESCRIBE response. More on DESCRIBE response and test methods based thereon later.

When receiving a DESCRIBE response, the moving picture player unit 102 transmits a SETUP request in RTSP to the server 30 through the communication unit 16 and the IP net 60 (m3). The server 30, upon receipt of the SETUP request, allocates resources for the distribution of contents, and in response transmits a SETUP response to the moving picture player unit 102 (m4). In this manner, the moving picture player unit 102 and the server 30 share content transmission methods and port numbers to be used in the transmission. If the content to be played back by the moving picture player unit 102 is a scheduled-distribution content, when receiving the SETUP response the moving picture player unit 102 completes its playback preparation processing and moves to the wait state.

If the content to be played back by the moving picture player unit 102 is an on-demand content, the moving picture player unit 102 transmits a PLAY request, which is a request for distribution of the content to be played back, to the server 30 through the communication unit 16 and the IP net 60 (m5). Also, if the content to be played back by the moving picture player unit 102 is a scheduled-distribution content and the moving picture player unit 102 receives the PLAY command from the controller 101, the moving picture player unit 102 transmits a PLAY request, which is a request for distribution of the content to be played back, to the server 30 through the communication unit 16 and the IP net 60 (m5). The server 30, upon receipt of these PLAY requests, returns a PLAY response, which is a reply to the PLAY request, to the content playing device 20 (m6), and starts the transmission of contents to the moving picture player unit 102 by using RTP (A Transport Protocol for Real-Time Applications), for example. If the content to be played back by the moving picture player unit 102 is an on-demand content, upon receipt of the PLAY response the moving picture player unit 102 completes its playback preparation processing and moves to the wait state.

Since still image and telop contents are on-demand contents in this mode of embodiment, when downloading these contents by using HTTP (Hyper Text Transport Protocol), the still image player unit 103 and the telop player unit 104 finish the playback preparation processing and assume the wait state. If the still image or telop contents are scheduled-distribution contents, similar to the moving picture player unit 103, the still image player unit 103 and the telop player unit 104 perform playback preparation processing in a sequence similar to that in the moving picture player unit 103, and after the start of playback, they can download the content file.

FIG. 9 is a drawing showing an example of DESCRIBE response with respect to an on-demand content. Referring to FIG. 9, the DESCRIBE response contains [a=type: vod seekable] in its line 4, which is content type identification information indicating that it is an on-demand content, not provided in conventional methods. The moving picture player unit 102, by detecting this description (especially [vod]), determines that the content is an on-demand content.

If on-demand contents are distributed in uni-cast and scheduled-distribution contents are distributed in multi-cast, the destination address specified in [c=IN IP 4 0.0.0.0] provided in line 1 of the DESCRIBE response in FIG. 9 can be used as content type identification information. In this case, the moving picture player unit 102, based on whether the destination address is a multi-cast address, judges whether the content is an on-demand content or a scheduled-distribution content. Specifically, if the address is a multi-cast address, the moving picture player unit can determine that the content is a scheduled-distribution content and if the address is a uni-cast address, the moving picture player unit can determine that the content is an on-demand content.

Further, the moving picture player unit 102 can use type identification information for which time notation is the content type, as in the case of [a=range: npt=0-15:015] provided in line 4 of DESCRIBE response in FIG. 9. In this case, the moving picture player unit 102 determines whether the content is an on-demand content or a scheduled-distribution content, based on whether relative time (relative to the beginning of the content) or absolute time (year, month, hour, minute, second, etc.), such as [a=range: clock=20090520T2115–20090520 T2203] is employed.

FIG. 10 is a drawing showing an example of DESCRIBE response with respect to a scheduled distribution content. Referring to FIG. 10, the DESCRIBE response in the present mode of embodiment specifies [a=type: scheduled] in line 3, which is content type identification information indicating that the content is a scheduled-distribution content, not used in conventional cases. The moving picture player unit 102, by detecting this description (especially [scheduled]), determines that the content is a scheduled-distribution content.

Figure 11:
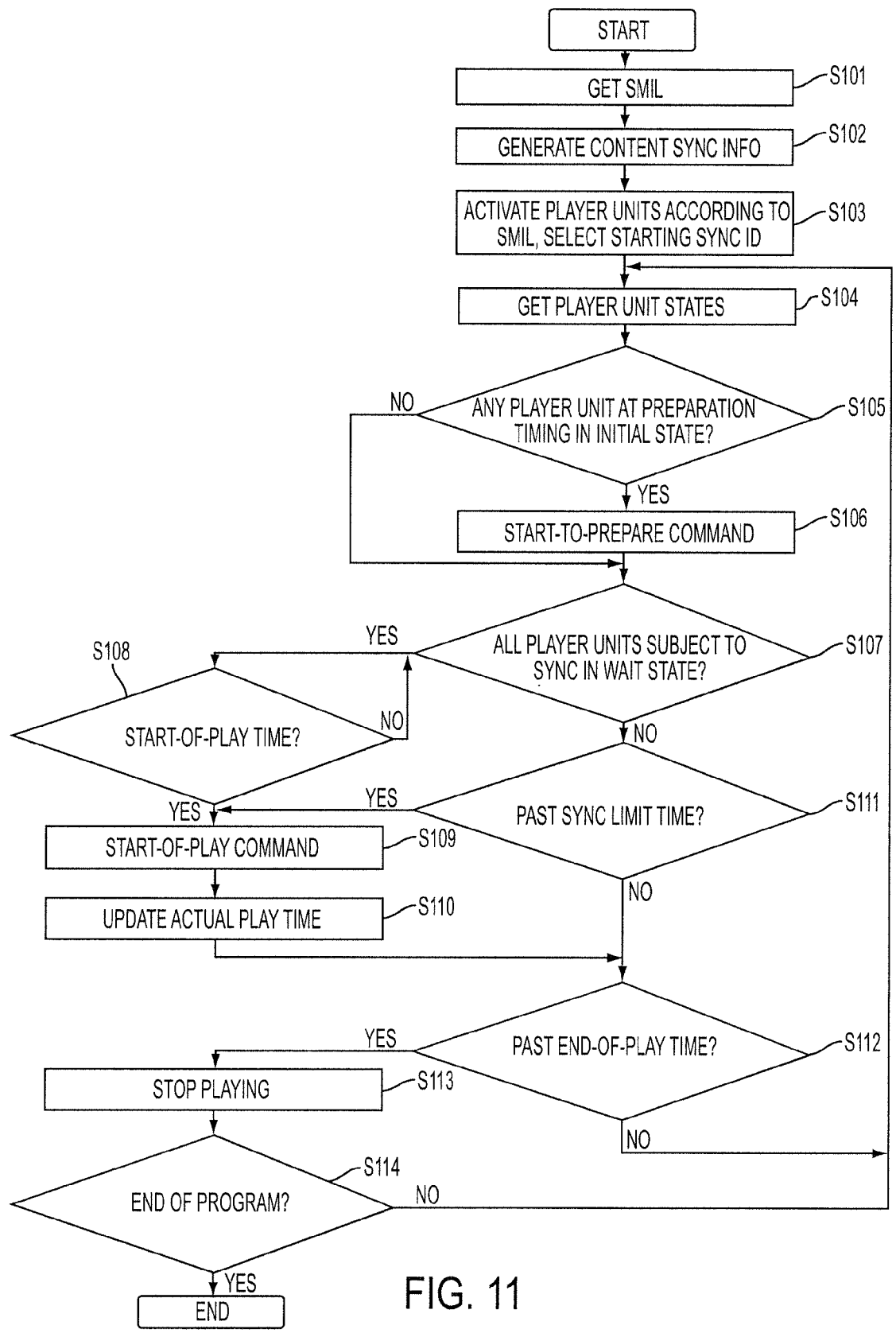
[FIG. 11] a flowchart on the synchronous display of multiple contents in a mode of embodiment of the present invention: a flowchart depicting the operation of the controller unit.

FIG. 11 is a flowchart on the synchronous display of multiple contents in a mode of embodiment of the present invention; it is a flowchart depicting the operation of the controller unit.

Referring to FIG. 11, the controller 101 first downloads an SMIL file from the server 30 through the communication unit 16 and the IP net 60 (S101). It should be noted that the downloaded SMIL file is an SMIL file corresponding to a number selected by the user, for example. The SMIL file contains the following types of information, as shown in FIG. 4 that was referred to previously: information that shows contents that are multi-screen displayed and composing a program; information that defines the display area for multi-screen display; information that shows start-of-playback timing (start-of-playback time) for those contents; and information that shows the synchronization relationship between those contents. The user, viewing the monitor 40 displaying a list of available programs downloaded by the content playing device 20 from the server 30, operates the remote controller 50, and selects a desired program from the list.

Also, it is possible that the memory 12 of the content playing device 20 stores a program specification and a scheduled time at which said program is to be played back so that a program in the SMIL file shown in FIG. 4, for example, is played back at 7 o'clock, and that the controller 101 downloads the SMIL file according to the scheduled time. In this case, the controller 101 downloads the SMIL file by predetermined time a ahead of the scheduled time so that preparations can be made by the scheduled time. It should be noted that preferably the amount of time a should be larger than amount of time β to be discussed later, so that preparations can be made before the time at which the program is played back. In this case, the scheduled time is set to the program playback starting time that is employed when synchronization information is generated in Step S102, to be described later.

Next, the controller 101, based upon the downloaded SMIL file, generates information (synchronization information) that indicates the synchronization of contents, and stores it in the synchronization information storage unit 100 (S102). An example of synchronization information is shown in FIG. 6. If a program start-of-playback time is not fixed, such as in situations where a decision on the SMIL file to be downloaded in Step S101 is made by the user by selecting a desired program, the current time is acquired from the clock provided in the content playing device 20, and synchronization information is generated by using that time as the start-of-playback time.

In the next step, the controller 101 generates player units according to the content types (moving picture, still picture, or telop) and associates them for each content that constitutes a desired program, defined in the SMIL file, according to the downloaded SMIL file. For example, in the case of the SMIL file shown in FIG. 4, for each of the moving picture contents "stock.mpg", "currency.mpg", and weather.mpg", a moving picture player unit 102 is generated and the units and the files are put in correspondence; for each of the still picture contents "stock.bmp", "currency.bmp", and weather.bmp", a still picture player unit 103 is generated and the units and the files are put in correspondence; and for each of the telop contents "stock.txt", "currency.txt", and weather.txt", a telop player unit 104 is generated and the units and the files are put in correspondence. Further, the controller 101 selects the starting sync ID as the sync ID to be subject to synchronization from the synchronization information that is stored in the synchronization information storage unit 100 (S103).

In the next step, the controller 101 downloads the status of each player unit (S104). Here, the status of each player unit is one of the following, shown in FIG. 7: initial state, preparation state, wait state, and playback state. The controller 101 references the synchronization information on the selected sync ID which is synchronization information stored in the synchronization information storage unit 100, and determines whether there is a content which is associated with a player unit that is in the initial state, and which is past its preparation time (S105). If as a result of this test there is an applicable content ("Yes" in S105), the controller directs the player unit associated with the content to prepare for starting (S106), and moves to Step S107. Here, the preparation timing is a time which is faster than the start-of-playback time associated with the sync ID subject to synchronization by a predetermined amount of time β (by 10 seconds, for example). If as a result of the test in Step S105 there is no applicable content ("No" in S105), the controller moves to Step S107.

In the next step, in Step 107, the controller 101 references the synchronization information on the selected sync ID which is synchronization information stored in the synchronization information storage unit 100, and determines whether all player units associated with the contents subject to synchronization are in the wait state (S107). It should be noted that the "wait state" refers to the condition in which playback preparations have been finished. To explain the test operation in concrete terms, referring to FIG. 6 as an example, if the moving picture display region A1 "stock.mpg" "fixed", the still picture display region A2 "stock.bmp" "fixed", and the telop display region A3 "stock.txt" "fixed" are associated with the sync ID "2", the contents of the moving picture "currency.mpg", the still picture "currency.bmp", and the telop "currency.txt" to be displayed in the moving picture display region A1, the still picture display region A2, and the telop display region A3, respectively, will be subject to synchronization. In this case, a determination is made as to whether the moving picture player unit 102, the still picture player unit 103, and the telop player unit 104 associated with the moving picture "currency.mpg", the still picture "currency.bmp", and the telop "currency.txt" are all in the wait state.

In the synchronization information shown in FIG. 6, if the moving picture display region A1 "in 3 seconds or less", the still picture display region A2 "in 3 seconds or less", and the telop display region A3 "in 3 seconds or less" are associated with the sync ID "3", the contents displayed in the moving picture display region A1, the still picture display region A2, and the telop display region A3 are subject to synchronization. These types of synchronization are specified as "in 3 seconds or less" instead of "fixed". In this case, the controller 101 concludes that the playback preparations are finished when the moving picture player unit 102, the still picture player unit 103, and the telop player unit 104 are all in the wait state or it has been 3 seconds since the start-of-playback time [Ta2+00:30], where the start-of-playback time [Ta2+00:30] represents the time which is 30 seconds past the actual playback time [07:00:15] for the sync ID "2".

If it is judged that all content players that are subject to synchronization are in the wait state ("Yes" in S107), control moves to Step S108. The controller 101 waits until the start-of-playback time associated with the sync ID that is subject to synchronization (S108), and moves to Step S109. Next, the controller 101 directs the player unit of the content subject to synchronization to start playback (S109). Next, the controller 101 updates the synchronization information for the selected sync ID, using the time when the player unit that received the start-of-playback command started playback as an actual playback time, and when all player units for the contents subject to synchronization have started playback, the controller updates the selected sync ID to the next sync ID in the synchronization information (S110). Next, control moves to Step S112.

If it is judged in Step S107 that any of the contents player units that are subject to synchronization is not in the wait state ("No" in S107), the controller 101 determines whether the synchronization limit time has passed (S111), where the "synchronization limit time", when a time is specified for each display region as in the case of sync ID "3" in FIG. 6, refers to the start-of-playback time associated with the sync ID incremented by a specified length of time. For example, in the case of the sync ID "3" in FIG. 6, if the start-of-playback time is [Ta2+00:30] and the specified length of time is "3 seconds or less", the synchronization limit time will be [Ta3+00:33] which is the specified length of time added to the start-of-playback time. Further, if [fixed] instead of a time is specified in a display region, as in the case of sync IDs "1" and "2" in FIG. 6, since a synchronization limit time is not specified, in Step S111 it is always judged that a synchronization limit time has not passed. In Step S111, if it is judged that the synchronization limit time has passed ("Yes" in S111), the controller 101 moves to the aforementioned Step S109, and subsequently it operates in the same manner as explained above. In this case, player units that are not in the wait state retain the start-of-playback command from the controller 101 in Step S109, and when the wait state is on, they start the playback of the content based on the start-of-playback command.

In Step S111, if it is judged that the synchronization limit time has not passed ("No" in S111), control moves to Step S112. In Step S112, the controller 101 determines whether the contents that are being played back have passed the end-of-playback time, where the end-of-playback time value is obtained by adding the playback time (set in [dur=] in the SMIL file) for each content to the actual playback time in the synchronization information. If it is determined in Step S112 that the end-of-playback time has passed ("Yes" in S112), the controller 101 sends a stop-playback command to the player units corresponding to the contents that are past the end-of-playback time (S113).

Next, the controller 101 determines whether the program has ended. If it is determined that the program has ended ("Yes" in S114), the controller terminates the processing. If it is determined that the program has not yet ended ("No" in S114), control returns to Step S104, and the subsequent steps are repeated.

Figure 12:
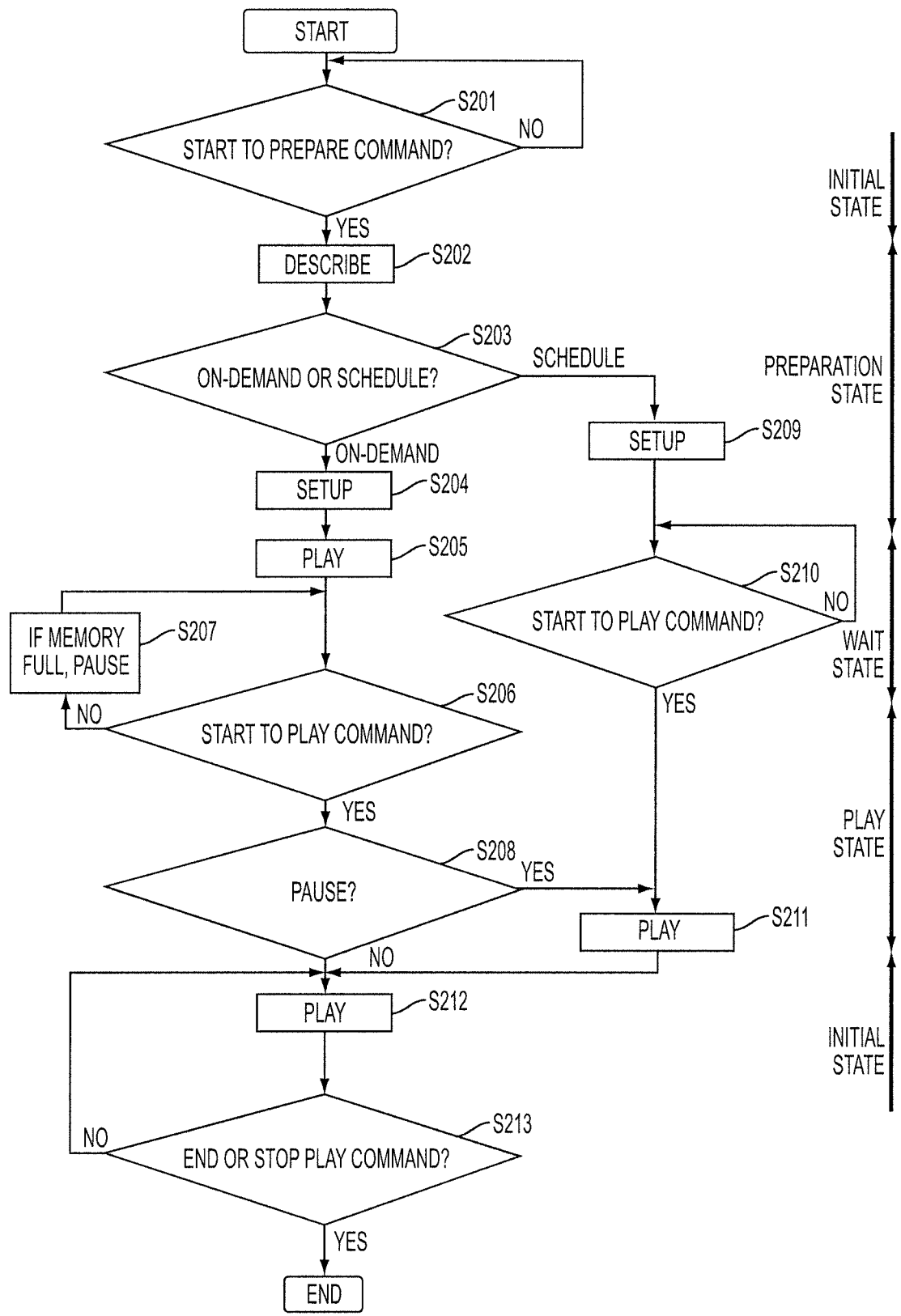
[FIG. 12] a flowchart on the synchronous display of multiple contents in a mode of embodiment of the present invention: a flowchart depicting the operation of the moving picture player unit.

FIG. 12 is a flowchart on the synchronous display of multiple contents in a mode of embodiment of the present invention: a flowchart depicting the operation of the moving picture player unit.

Referring to FIG. 12, when activated by the controller 101, the moving picture player unit 102 goes into the initial state, and waits for a start-of-preparation command (S201). Upon receipt of a start-of-preparation command from the controller 101, the moving picture player unit 102 goes into the preparation state, and requests information on the content to be played back by sending a DESCRIBE request to the server 30; the moving picture player unit 102 receives the response, thereto, which is the DESCRIBE response (S202).

Next, based on the content type identification information in the DESCRIBE response that was received, the moving picture player unit 102 determines whether the content to be played back is an on-demand content or a scheduled-distribution content (S203). If it is determined that the content is an on-demand content ("on-demand" in S203), control moves to S204.

The moving picture player unit 102 transmits a SETUP request specifying a destination address and a port number to the server 30. When receiving the response SETUP response, the moving picture player unit sets up reception using the specified destination address and port number (S204). It should be noted that if a content is to be transmitted in uni-cast, the destination address, which is the address of the local apparatus, does not need to be set up. In the case of multi-cast transmission, however, the address employed in the multi-casting will be the destination address.

Next, the moving picture player unit 102 transmits a PLAY request, which is a request to distribute content, to the server 30. When receiving the response PLAY response, the moving picture player unit goes into the wait state, and receives the content that the server 30 has started distributing, and stores it in the memory 12 (S205).

Next, the moving picture player unit 102 waits for a start-of-playback command from the controller 101 (S206). In the meantime, the moving picture player unit 102 receives the contents that are continuously downloaded from the server 30 and stores them in the memory 12. However, if the stored contents make the memory with a prescribed capacity full, the moving picture player unit transmits a PAUSE request to the server 30, requesting that the downloading of the contents be stopped (S207). While waiting for a start-of-playback command, the moving picture player unit needs to transmit the PAUSE request only once. If control moves to Step S207 via Step S206 after the PAUSE request was sent, the PAUSE request will not be sent again.

Next, when receiving a start-of-playback command from the controller 101 ("Yes" in S206), the moving picture player unit 102 goes into the playback state, and determines whether a PAUSE request was sent in Step S206 (S208). If it is determined that it was sent ("Yes" in S208), control transitions to Step S211, and the moving picture player unit sends a PLAY request, which is a content distribution request, to the server 30. If it is determined that a PLAY request was sent in Step S211 or a PAUSE request was not sent in Step S208, the moving picture player unit 102 outputs and plays back the contents received from the server 30 and stored in the memory 12 with respect to the moving picture decoder 103 (S212). The moving picture player unit 102 continues to play back until either the moving picture content ends or a stop-playback command is received from the controller 101 (S213). If the moving picture content ends or a stop-playback command is received, the processing terminates, and the initial state is assumed.

In Step S203, if it is determined that the content is a scheduled-distribution content, the moving picture player unit 102 transmits a SETUP request specifying a destination address and a port number to the server 30. When receiving the response SETUP response, the moving picture player unit sets up reception using the specified destination address and port number (S209), and goes into the wait state. Next, the moving picture player unit 102 waits for a start-playback command from the controller 101 (S210). When receiving a start-playback command from the controller 101, the moving picture player unit 102 goers into the playback state, transmits a PLAY request, which is a content distribution request, to the server 30 (S211), transitions to Step S212), and subsequently operates in the same manner as the operation described above.

Turning to the still picture player unit 103 and the telop player unit 104, since in this mode of embodiment the still picture contents and telop contents are on-demand contents, these player units, when downloading these content files by using HTTP and other protocols, finish the playback preparation processing and go into the wait state. With regard to the still picture player unit 103 and the telop player unit 104, if the still picture contents and telop contents are scheduled-distribution contents, they can operate according to the type of flowchart shown in FIG. 12, similar to the moving picture player 103, and after the start of playback, they can download such content files.

Thus, the moving picture player unit 102 determines whether the content to be played back is a scheduled-distribution content or an on-demand content, based upon the identification information on the content type in the DESCRIBE response. If the results of the determination indicate that the content to be played back is an on-demand content, the playback preparation processing includes a content distribution request (PLAY request) to the server 30; if the content to be played back is a scheduled-distribution content, the playback preparation processing does not include a content distribution request to the server 30.

Consequently, if the content is a scheduled-distribution content, the moving picture player unit 102, after receiving a start-of-playback command from the controller 101, that is, after the playback state is assumed, plays back the downloaded content. Therefore, the content playing device 20 of the present mode of embodiment, in regard to the scheduled-distribution contents, while displaying the time fixed by the distribution schedule thereof, can display multiple contents including the scheduled-distribution content by synchronizing them. It should be noted that delays can occur due to transmission delays on the IP net 60 or delays in the decoding processing in the content playing device 20, and as a result a content can be displayed later than the time fixed by the distribution schedule; however, since the decoded content is played back without subjecting it to processing that leads to delays, for example, without the buffering of content data that can sometimes be distributed before a start-of-playback command, the content determined by a distribution schedule can be played back with little time deviation from the determined time. In this manner, the content playing device 20 can avoid displaying a content that would have been displayed in the past later than a time fixed by a distribution schedule.

Further, since the content playing device 20 plays back the content data that can sometimes be distributed before the start-of-playback command, it can prevent the display of content data that was distributed before the start-of-playback command, that is, a content other than the desired content.

In addition, since the content playing device 20 issues a start-of-playback command for a scheduled-distribution content after the start-of-playback time has arrived, it can prevent the type of error wherein the server 30 managing the scheduled-distribution contents indicates that the particular scheduled-distribution does not exist.

Figure 13:
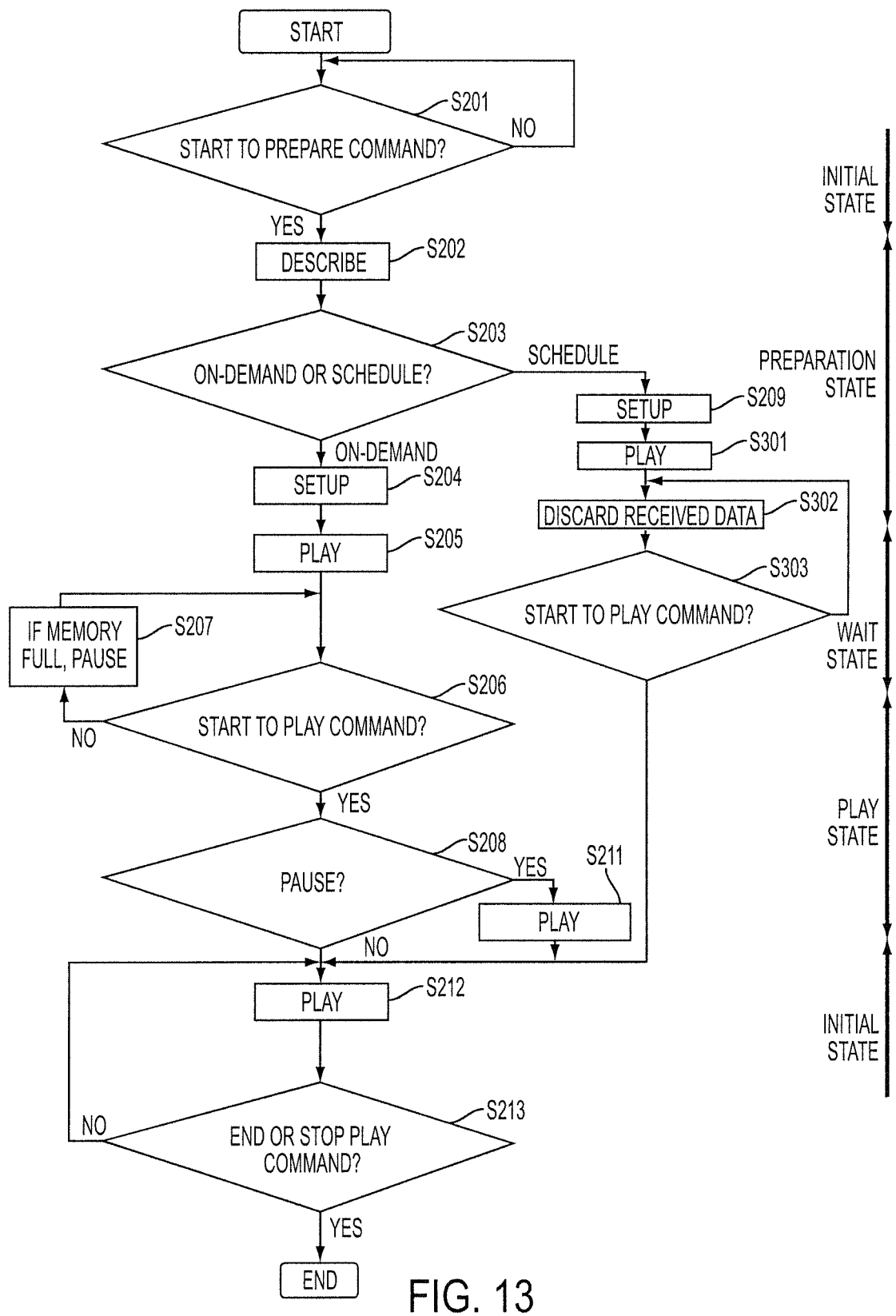
[FIG. 13] a flowchart on the synchronous display of multiple contents in a mode of embodiment of the present invention: a flowchart depicting another example of the operation of the moving picture player unit.

FIG. 13 is a flowchart on the synchronous display of multiple contents in a mode of embodiment of the present invention: a flowchart depicting another example of the operation of the moving picture player unit. This example of a modified example that was explained in the preceding FIG. 12. In the figure, the parts corresponding to FIG. 12 are assigned the same codes (S201-S209, S211-S213), and an explanation thereof is omitted. The flowchart shown in FIG. 13 differs in that it includes Steps S301, S302, and S303 in place of Step S210.

In Step S301, the moving picture player unit 102 sends a PLAY request, which is a request for distribution of content, to the server 30; when receiving the response PLAY response, the moving picture player unit goes into the wait state. In Step S302, the moving picture player unit 102 receives the content data, the distribution of which was started by the server 30 that in succession received the PLAY request. The moving picture player unit 102, however, discards the received data. Here, the moving picture player unit 102 can discard the received, that is, downloaded data, in units of data downloading or in units of bits, which are the smallest units of data, for example. By way of illustration, if a moving picture content is transmitted in units of TS packets in MPEG2-TS (Transport Stream) and if the moving picture player unit 102 downloads data in units of TS packets, the data are discarded in units of TS packets.

Next, in Step S303, the moving picture player unit 102 waits for a start-of-playback command from the controller 101. Also during this time, the moving picture player unit 102 discards any received content data. When receiving the start-of-playback command from the controller 101, the moving picture player unit goes into the playback state, and transitions to Step S212. In this case, the moving picture player unit 102, when receiving the start-of-playback command, transitioning to Step S212, and going into the playback state, the moving picture player does not discard the received content data, and outputs it to the moving picture decoder 103 and plays it back. It should be noted that if the discarding of data is done in units of data downloading, before the moving picture player unit 102 goes into the playback state by receiving a start-of-playback command, the content playing device 20 contains the received data as a complete data downloading unit, and if after the moving picture player unit 102 has gone into the playback state, the moving picture player unit 102 can play back any downloaded data without discarding it, or the moving picture player unit 102 can discard it.

Thus, the moving picture player unit 102 determines whether the content to be played back is a scheduled-distribution content or an on-demand content, based upon the identification information on the content type in the DESCRIBE response. If the results of the determination indicate that the content to be played back is on-demand content, the playback preparation processing includes a content distribution request to the server 30; however, the received data is discarded until a start-of-playback command is received.

Consequently, if the content is scheduled-distribution content, the moving picture player unit 102 exclusively plays back the data that was downloaded after a start-of-playback command was received from the controller 101, that is, after the playback state is assumed. Therefore, the moving picture player unit, while displaying the scheduled-distribution contents according to the distribution schedule, can display multiple contents including the scheduled-distribution content by synchronizing them.

The above is a detailed description of modes of embodiment of the present invention with references to drawings. However, specific constitutions are not limited to these modes of embodiment; they can include design modifications and so forth in a scope that does not deviate from the essence of the invention.

Potential Industrial Use

This invention can be favorably used in content distribution/playback systems that distribute and play back multiple contents including moving picture contents through the use of networks including the Internet; however, the present invention is not limited to these applications.

What is claimed is:

1. An apparatus that plays back multiple contents and displays them in parallel on a monitor, said apparatus comprising:
    multiple player units that play back said multiple contents, respectively;
    control means configured for:
        downloading playback information on said multiple contents;
        determining whether the content to be played back comprises on-demand content or scheduled content for which the schedule of distribution is predetermined;
        directing all of said multiple player units to start a preparation for playback, wherein the multiple player units go into a wait state after performing preparation for playback; and
        directing all of said multiple player units to start a playback; and
    outputting means configured for directing the output of video signals for each of said multiple played back contents to said monitor,
    wherein when said content is determined to comprise on-demand content, the multiple player units are configured to begin to download said content while performing a preparation for playback,
    wherein when said content is determined to be scheduled content, the multiple player units are configured to perform preparation for playback without downloading the scheduled content and to begin to download scheduled content in response to a start-of-playback command, and
    wherein when the content is determined to be scheduled content, the control means is configured to wait to issue the start-of-playback command until both a start of playback time is reached and all of the multiple player units go into a wait state after completing preparation, the start-of-playback command instructing the multiple player units to begin downloading the scheduled content.

2. The apparatus of claim 1, wherein the apparatus further comprises a memory unit that stores downloaded contents, wherein said multiple contents further include an on-demand content, wherein the downloading of said on-demand content is started by the player unit that plays back the on-demand content, and wherein said on-demand content stored in said memory is played back in response to said start-of-playback command.

3. The apparatus of claim 1, wherein the directing means is further configured for making a determination as to whether said multiple contents are scheduled-distribution type content or on-demand content and wherein said determination is made based on the identification information of the downloaded content.

4. The apparatus of claim 1, wherein the scheduled contents are discarded by a player unit until said start-of-playback command, and wherein the scheduled content thereafter is played back.

5. The apparatus of claim 1, wherein said outputting means is further configured for outputting video signals for multi-screen display to a monitor by combining said played back multiple contents.

6. A method for playback that displays multiple contents on a monitor in parallel, the method comprising:
    downloading, by a controller, playback information on said multiple contents, wherein said playback information includes information that represents said multiple contents and, for scheduled content, a timing at which the playback of said multiple contents is started;
    determining whether the multiple contents comprise on-demand content or schedule content;
    preparing for playback by each of multiple player units, wherein the player units go into a wait state after preparing for playback; and
    directing all of said multiple player units to start playback,
    wherein when said content is determined to comprise on-demand content, the multiple player units are configured to begin to download said content while performing a preparing for playback,
    wherein when content is determined to be scheduled content, the multiple player units are configured to prepare for playback without downloading said content and to begin to download said content in response to a start-of-playback command, and
    wherein the controller is configured to wait to issue the start-of-playback command until both a start of playback time is reached and all of the multiple player units on into a wait state after completing preparation for playback, when the content is determined to be scheduled content, the start-of-playback command instructing the multiple player units to begin downloading the content.

7. The method of claim 6, wherein said multiple contents include on-demand content, wherein the multiple player units that playback said on-demand content download said on-demand content after performing said preparation, and wherein the playback of the on-demand content stored in a memory is started in response to said start-of-playback command.

8. The method of claim 6, further comprising determining whether said multiple contents are scheduled-distribution contents or on-demand contents, wherein said determining comprises downloading of content identification information and performing the determination based upon the content identification information.

9. The method of claim 6, wherein said playback information includes a playback synchronization relationship between said multiple contents, and wherein the controller is configured to direct said multiple player units to start a playback after a passage of a prescribed length of time if not all of said multiple player units go into a wait state from a start-of-playback time until a prescribed time contained in said playback synchronization relationship.

10. The method of claim 6, wherein the multiple player units that play said scheduled-distribution content are configured to discard discards the scheduled-distribution contents, and to stop said discarding in response to said start-of-playback command, and subsequently plays back the downloaded scheduled-distribution content.

11. The method of claim 6, further comprising outputting video signals for multi-screen display to the monitor by combining said played back multiple contents.

* * * * *